Dec. 2, 1952 — L. GLASER ET AL — 2,619,672
GRIP INSULATOR
Filed May 17, 1949
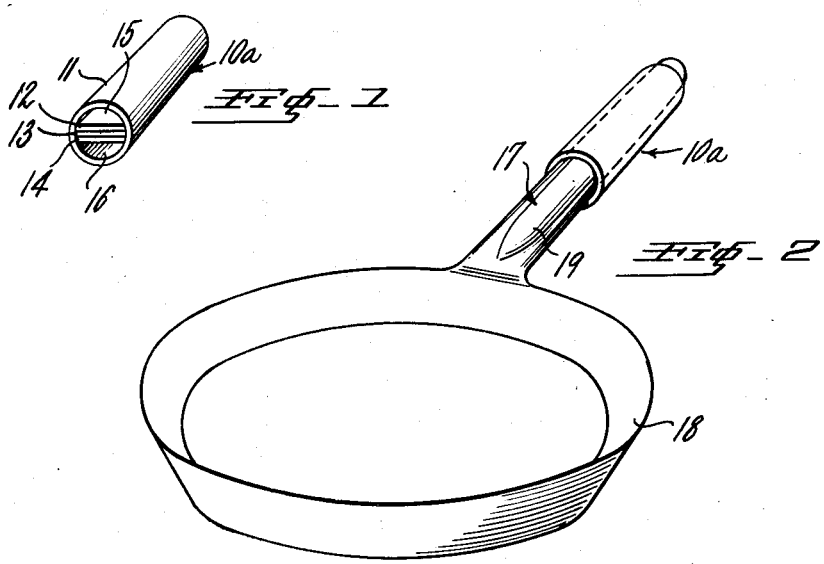
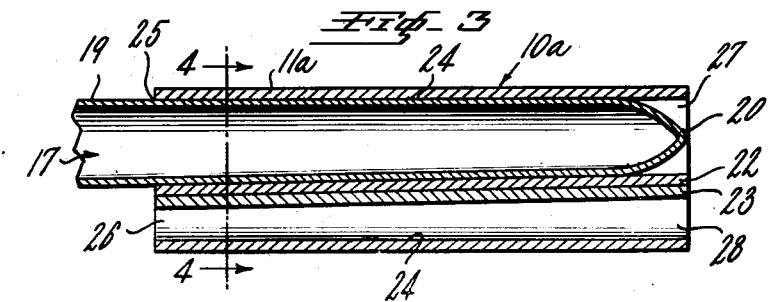
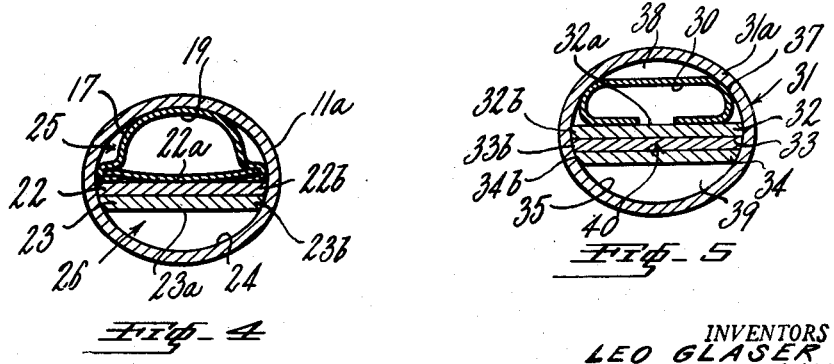
INVENTORS
LEO GLASER
MAX M. HAHN
BY Leon M. Straus Patented Dec. 2, 1952

2,619,672

UNITED STATES PATENT OFFICE 2,619,672

GRIP INSULATOR

Leo Glaser and Max M. Hahn, New York, N. Y.

Application May 17, 1949, Serial No. 93,765

3 Claims. (Cl. 16—116)

This invention relates to detachable heat insulating handle grips for use in connection with kitchen utensils and similar appliances which have handles for carrying such utensils or appliances.

Handle grips are known to be slid over the handle of a kitchen utensil. Such grips, however, do not fit various shapes and sizes of handles. Other handle grips are known which make use of a ferrule at one end of the handle grip, which ferrule is compressible to prevent slipping off of the grip from the handle of the utensil. Other protective grips for handles of kitchen utensils are wrapped around such handle and are provided with a continuous lining in order to facilitate heat insulation for the grip proper.

These and other known handle grips are either of complicated construction or can usually only be applied to a particular shape of a handle for kitchen utensils so that several handle grips have to be employed for various handles to properly protect the hand of a person against heat.

The present invention avoids the aforesaid disadvantages and provides means facilitating manufacture of a handle grip which is extremely inexpensive in production, very simple in structure and is universally applicable to practically any shape and length or size of handles of pots, pans and similar kitchen utensils.

It is a further advantage of this invention to provide means affording the employment of a standard lengthy cardboard or similar tubular body of predetermined diameter and cutting the same to a grip of desired length for application to various sizes of handles of kitchen utensils, said tubular body providing at least four openings through which handles of various sizes may be inserted for engagement therewith.

Still another object of the invention is to provide means ensuring ready adaptation of the handle grip to the handle which it frictionally engages whereby a firm hold is obtained which permits lifting even of heavy pans or pots without any danger of slipping off of the grip from the handle.

Another object of the present invention is to provide means enabling the transformation of a round tubular member to a predetermined number of frictionally engageable grip sheaths, each of which being readily deformable to assume a shape oval or eliptical in cross section, shims being further inserted in the hollow or interior of said tubular member to bring about adaptation of said member to the particular configuration of the handle, simultaneously bracing or reinforcing said member.

Still another object of the present invention is to provide means enhancing the appearance of the handle grip without impairing its highly insulating properties against heat and the like.

With the above and other objects in view, the invention will be hereinafter more fully described and the combination and arrangement of parts will be shown in the accompanying drawing and pointed out in the claims which form part of the specification.

In the drawing:

Fig. 1 is an end view of a handle grip made in accordance with the invention and shown somewhat in perspective and on a reduced scale.

Fig. 2 illustrates a pan with handle, the grip for the handle being in applied position.

Fig. 3 is an enlarged vertical sectional view through a portion of the handle and through the handle grip in applied position.

Fig. 4 is a sectional view taken along line 4—4 of Fig. 3.

Fig. 5 is a sectional view of the handle and grip similar to that of Fig. 4 with a somewhat modified handle shape and with a grip provided with a plurality of shims.

Referring now more particularly to the drawing there is shown in Fig. 1 a handle grip 10 made in accordance with this invention. This handle grip consists of a tubular body 11 made from cardboard and cut from a lengthy stock or standard cardboard tube of predetermined diameter. Within said tube and throughout its length extend three compressible cardboard or pressboard shims 12, 13 and 14 whereby pairs of opposite openings 15 and 16 are obtained.

Fig. 2 shows the application of handle grip 10a to the handle 17 of a pan 18.

According to Fig. 3 this handle grip 10a is applied to a handle 17 having a rib 19.

Handle grip 10a in this particular instance is co-extensive with the end 20 of the handle 17 which, upon insertion through opening 25 of the handle grip body 11a, displaces, compresses and pushes two shims 22 and 23 to a position within the interior of the hollow grip 10a so that a tight frictional engagement takes place between shim 22 and handle body 17 at the inner surface 24 of the handle grip body 11a and at the upper surface 22a of shim 22.

As will be further seen from Fig. 3 besides opening 25 openings 26, 27 and 28 are obtained as a result of the insertion of the two shims 22, 23 which openings are variable in size due to ready displacement and compresesion of said shims 22 and 23 within the interior of the handle grip 10a.

If, as exemplified in Fig. 3, handle 17 is provided with a central rib 19 and a tapering end 20 the shims 22 and 23 are readily pressed in a direction perpendicular to the longitudinal axis of the grip body within the interior of the handle grip due to the fact that the latter as well as the shims are made from yieldable and somewhat compressible material such as cardboard, pasteboard, plastic, rubber and the like which at their edged ends 22b and 23b wedge and frictionally engage inner wall surface 24 of the grip body 11. The surfaces 22a and 23a of the shims are thus displaced from their normal middle position and the contiguous surfaces of the shims are pressed against each other.

It will become apparent that opening 25 is different in size and contour from the remaining openings 26, 27 and 28 which are also different from each other in that respect, as can be visualized from Fig. 3. It is further to be noted that if grip 10a is removed from handle 17 the grip can be readily used again to fit over any other and differently shaped handle whereby either opening 25, 26, 27 or 28 may be used to insert the respective handle into the grip with the shims placed therein adjusting themselves commensurate with the required space within the handle grip.

Fig. 5 shows a handle 30 in cross section as applied to a tubular grip 31 which contains the shims 32, 33 and 34 in superposed position and inserted lengthwise of the tubular body 31a and within the interior of the latter whereby said shims frictionally engage the inner surface 35 of the body 31a at opposite ends 32b, 33b and 34b.

Handle 30 rests on the surface 32a which is frictionally engages and also abuts against the inner surface 35 at 36 and 37. Shims 32, 33 and 34 upon sliding engagement of the handle 30 within opening 38 displaces shims 32, 33 and 34 in a direction toward the opening 39 which becomes thus decreased in size.

The composite partition 40 which is formed by shims 32, 33 and 34 may be displaced either gradually throughout the length of the grip at the ends of which openings 38 and 39 are constituted, or may be displaced or shifted simultaneously from end to end of the tubular grip 31.

Shims 32 and 33 or 34 may be loosely connected with each other and may be movable together in crosswise directions of the grip 31 whereby a large number of handle shapes and sizes may be accommodated within the interior of the grip 31. If desired, one of the shims, say, 34 may be removed in order to accommodate a handle which is still larger in cross section than handle 30 as shown in Fig. 5.

The configurations of the handle 17 or 30 as shown in Figs. 4 and 5 are entirely different from each other but still one and the same grip is employable to accommodate within the interior thereof a handle of a desired configuration.

In order to give the handle a pleasing outer appearance the same may be covered with any suitable layer of metalized paper, velvet-like fabric or similar material.

It can thus be seen that there has been provided in accordance with this invention a grip or protector for application to the handle of a kitchen utensil and like article, which grip is characterized by a lengthy tubular body made of heat insulating material and having an inner wall, and a partition extending lengthwise of and within the interior of said tubular body, said partition frictionally engaging said inner wall of said tubular body, whereby semi-cylindrical openings are obtained at either end of said tubular body, said partition being displaceable in a direction perpendicular to the longitudinal axis of said tubular body upon insertion of said handle into one of said openings.

As many possible embodiments may be made of the above invention, and as many changes may be made in the embodiment above set forth, it is to be understood that all matter hereinbefore set forth or shown in the accompanying drawing is to be interpreted as illustrative and not in a limiting sense.

Having thus described the invention, what is claimed as new and desired to be secured by Letters Patent, is:

1. A protector for application to various shapes and dimensions of handles of kitchen utensils or like articles, comprising a piece of cylindrical tubular body made of heat insulating material and defined by an inner wall, and a plurality of shims extending within the interior of said tubular body and substantially from one end to the other end thereof, said shims having opposite edged ends frictionally engaging the surface of said inner wall of said tubular body, to thereby provide two openings at either end of said tubular body, said shims being displaceable in lengthwise direction of and perpendicular to the longitudinal axis of said tubular body whereby a handle of a utensil may be forced into one of said openings, to frictionally contact one of said shims and a portion of said inner wall of said body extending adjacent said one shim.

2. A protector according to claim 1, wherein said shims frictionally engage each other within the interior of said body upon insertion of said handle of said utensil.

3. A protector for engagement with various shapes and dimensions of handles of kitchen utensils or like articles, comprising an elongated hollow body made of heat insulating material, and means extending substantially from one end to the other end of and within the interior of said body to obstruct the same, said means being directed across and frictionally retained in position by the engagement with the inner wall of said body, whereby said hollow body provided with a plurality of openings at either end of said body, said means being displaceable and compressible within said body upon sliding insertion of a handle into one of said openings, whereby said handle tightly engages said means and a portion of said inner wall adjacent thereto.

LEO GLASER.
MAX M. HAHN.

REFERENCES CITED

The following references are of record in the file of this patent:

UNITED STATES PATENTS

| Number | Name | Date |
|---|---|---|
| 326,313 | McIntyre | Sept. 15, 1885 |
| 1,216,653 | Brune | Feb. 20, 1917 |
| 1,263,508 | Zeckser | Apr. 23, 1918 |
| 1,376,126 | Willett | Apr. 26, 1921 |
| 1,825,314 | Heckman | Sept. 29, 1931 |